(12) United States Patent
Guo et al.

(10) Patent No.: US 10,734,779 B2
(45) Date of Patent: Aug. 4, 2020

(54) DUAL-WAVELENGTH SYNCHRONOUS PULSED FIBER LASER BASED ON RARE EARTH IONS CO-DOPED FIBER

(71) Applicant: SHENZHEN UNIVERSITY, Shenzhen, Guangdong (CN)

(72) Inventors: Chunyu Guo, Guangdong (CN); Weiqi Liu, Guangdong (CN); Shuangchen Ruan, Guangdong (CN); Jun Yu, Guangdong (CN); Yewang Chen, Guangdong (CN); Ruoheng Luo, Guangdong (CN); Yihuai Zhu, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 16/361,225

(22) Filed: Mar. 22, 2019

(65) Prior Publication Data

US 2019/0221986 A1    Jul. 18, 2019

Related U.S. Application Data

(63) Continuation of application No. PCT/CN2017/073567, filed on Feb. 15, 2017.

(30) Foreign Application Priority Data

Nov. 1, 2016    (CN) .......................... 2016 1 0941980

(51) Int. Cl.
*H01S 3/08* (2006.01)
*H01S 3/067* (2006.01)
(Continued)

(52) U.S. Cl.
CPC .......... *H01S 3/06716* (2013.01); *H01S 3/082* (2013.01); *H01S 3/0809* (2013.01);
(Continued)

(58) Field of Classification Search
CPC .. H01S 3/06791; H01S 3/0675; H01S 3/1608; H01S 3/1618; H01S 3/1115; H01S 3/0809
See application file for complete search history.

(56) References Cited

U.S. PATENT DOCUMENTS

2011/0158267 A1\* 6/2011 Tsai ...................... H01S 3/0675
                                                                    372/11

FOREIGN PATENT DOCUMENTS

CN         101071928 A       11/2007
CN         101854022 A       10/2010

OTHER PUBLICATIONS

International Search Report of PCT Patent Application No. PCT/CN2017/073567 dated Aug. 7, 2017.

(Continued)

*Primary Examiner* — Michael Carter

(57) ABSTRACT

The present application is applicable to laser technology field and provides a dual-wavelength synchronous pulsed fiber laser based on rare earth ions co-doped fiber, which includes a continuous light LD pumping source, a rare earth ions co-doped fiber and two resonant cavities. Sensitizing ions in the rare earth ions co-doped fiber absorb the pumping light and radiate laser of one wavelength. Meanwhile, sensitized ions in the rare earth ions co-doped fiber radiate laser of another wavelength. Laser generated by sensitizing ions is subjected to Q-switching or mode locking with the saturable absorber inserted in the cavity to generate pulsed laser. Generation and partial reabsorption for the pulsed laser modulates gain of the laser radiated by sensitized ions periodically and generates synchronous pulsed laser, thereby implementing a dual-wavelength synchronous pulsed fiber laser.

6 Claims, 3 Drawing Sheets

(51) Int. Cl.
*H01S 3/094* (2006.01)
*H01S 3/108* (2006.01)
*H01S 3/082* (2006.01)
*H01S 3/113* (2006.01)
*H01S 3/16* (2006.01)
H01S 3/0941 (2006.01)
H01S 3/11 (2006.01)
H01S 3/10 (2006.01)

(52) U.S. Cl.
CPC .. *H01S 3/094026* (2013.01); *H01S 3/094061* (2013.01); *H01S 3/108* (2013.01); *H01S 3/113* (2013.01); *H01S 3/1698* (2013.01); H01S 3/0675 (2013.01); H01S 3/06791 (2013.01); H01S 3/0941 (2013.01); H01S 3/10061 (2013.01); H01S 3/1115 (2013.01); H01S 3/1608 (2013.01); H01S 3/1618 (2013.01)

(56) References Cited

OTHER PUBLICATIONS

Rusu, M. et al., Passively Synchronized Erbium (1550-nm) and Ytterbium (1040-nm) Mode-Locked Fiber Lasers Sharing a Cavity, Optics Letters, Oct. 1, 2004, pp. 2246-2248, vol. 29, No. 19.
Boullet, J. et al., Tunable Red Light Source by Frequency Mixing from Dual Band Er/Yb Co-doped Fiber Laser, Optics Express, May 1, 2006, pp. 3936-3941, vol. 14, No. 9.

* cited by examiner

DUAL-WAVELENGTH SYNCHRONOUS PULSED FIBER LASER BASED ON RARE EARTH IONS CO-DOPED FIBER

CROSS REFERENCE TO RELATED APPLICATIONS

The present application is a Continuation Application of PCT Application No. PCT/CN2017/073567 filed on Feb. 15, 2017, which claims the benefit of Chinese Patent Application No. 201610941980.4 filed on Nov. 1, 2016. All the above are hereby incorporated by reference.

TECHNICAL FIELD

The present application pertains to the laser technology field, and particularly relates to a dual-wavelength synchronous pulsed fiber laser based on rare earth ions co-doped fiber.

BACKGROUND

Dual-wavelength lasers with large separation are widely applied in sum-frequency/difference-frequency generation, remote sensing, laser ranging and medical applications. Particularly, dual-wavelength synchronous pulse laser has the advantages of synchronous dual-wavelength pulse output with large pulse energy and high peak power, rendering it with better practical application effects. As compared to conventional solid lasers, fiber lasers get much attention due to their outstanding advantages such as good heat dissipation effect, high conversion efficiency, low threshold, good light beam quality and ease of integration. At present, there are mainly three ways for implementing dual-wavelength synchronous pulse laser output with fiber lasers, which are listed as follows.

1. Dual-wavelength synchronous Q-switching or mode locking is achieved by means of an ion doped gain fiber. Due to the limitation of gain bandwidth, the two wavelengths generated in this way are very close, which limits its application.

2. Dual-wavelength synchronous Q-switching or mode locking is realized by means of two types of gain fibers doped with different ions. These two kinds of gain fibers are located in two different cavities respectively and the two cavities realize dual-wavelength synchronous Q switching or mode locking by using one Q modulator or broadband saturable absorber in common. The two wavelengths generated in this way are far from each other. However, its structure is relatively complex and imposes higher requirements on the manufacturing of the Q modulator or the saturable absorber.

3. A cascading dual-wavelength synchronous pulse laser by means of an ion doped gain fiber. The cascading is transition of laser from a low energy level to an even lower energy level to generate laser of another wavelength. Via this way, transition between two energy levels of the ion is implemented by Q switching or mode locking to generate pulsed laser, in which process the population inversion on the upper level of the additional two levels of the ions is modulated periodically, thereby generating dual-wavelength synchronous pulse laser. However, this is related to factors such as ion doping concentration, doped substrate and cavity parameter. At present, dual-wavelength laser is primarily generated by cascading Holmium- or Erbium-doped fluoride fibers. However, since it is difficult to melt the fluoride fiber with quartz fiber, totally fiber-made lasers are limited, and the method only realizes dual-wavelength synchronous Q-switched, gain switched pulse output with broad pulse width at present.

SUMMARY

One technical problem to be addressed by the present application is to provide a dual-wavelength synchronous pulsed fiber laser based on rare earth ions co-doped fiber, in order to achieve a dual-wavelength synchronous pulsed fiber laser totally with fibers, by using a rare earth ions co-doped fiber with energy transfer between ions.

The present application provides a dual-wavelength synchronous pulsed fiber laser based on rare earth ions co-doped fiber. The dual-wavelength synchronous pulsed fiber laser comprises a continuous light LD pumping source, a rare earth ions co-doped fiber and a resonant cavity, the continuous light LD pumping source is connected with the resonant cavity, the rare earth ions co-doped fiber is located in the resonant cavity for absorbing pumping light emitted from the continuous light LD pumping source and radiating laser, and the resonant cavity is a linear cavity or a ring cavity.

Further, the linear cavity contains therein a broadband mirror, a saturable absorber, a pumping coupling device, a rare earth ions co-doped fiber, a fiber wavelength division multiplexer $WDM_1$, an optical delay line $DL_1$, a fiber Bragg grating $FBG_1$ and a fiber Bragg grating $FBG_2$;

the linear cavity comprises a first linear cavity and a second linear cavity, wherein the first linear cavity contains therein a broadband mirror, a saturable absorber, a pumping coupling device, a rare earth ions co-doped fiber, a fiber wavelength division multiplexer $WDM_1$ and a fiber Bragg grating $FBG_1$ in sequential connection, the second linear cavity contains therein a broadband mirror, a saturable absorber, a pumping coupling device, a rare earth ions co-doped fiber, a fiber wavelength division multiplexer $WDM_1$, an optical delay line $DL_1$ and a fiber Bragg grating $FBG^2$ in sequential connection; and the continuous light LD pumping source is connected with the linear cavity via the pumping coupling device;

the first linear cavity constitutes a guiding resonant cavity for laser radiated by sensitizing ions, the second linear cavity constitutes a guided resonant cavity for laser radiated by sensitized ions; and the first linear cavity and the second linear cavity are connected via the fiber wavelength division multiplexer $WDM_1$.

Further, the broadband mirror is one of a dielectric mirror, a metal mirror and a fiber mirror.

Further, the fiber Bragg grating $FBG_1$ has a central wavelength of Bragg reflection corresponding to a wavelength of laser radiated by sensitizing ions and a transmissivity of 5% to 80% for the wavelength; the fiber Bragg grating $FBG_2$ has a central wavelength of Bragg reflection corresponding to a wavelength of laser radiated by sensitized ions and a transmissivity of 5% to 80% for the wavelength.

Further, the ring cavity includes therein a fiber wavelength division multiplexer $WDM_1$, a pumping coupling device, a rare earth ions co-doped fiber, a fiber wavelength division multiplexer $WDM_2$, an optical fiber coupler $OC_1$, a fiber polarization-independent isolator $ISO_1$ and a saturable absorber or artificial saturable absorber, an optical fiber coupler $OC_2$, a fiber polarization-independent isolator $ISO_2$ and an optical delay line $DL_1$;

the ring cavity comprises a first ring cavity and a second ring cavity, wherein the first ring cavity includes therein a fiber wavelength division multiplexer $WDM_1$, a pumping coupling device, a rare earth ions co-doped fiber, a fiber wavelength division multiplexer $WDM_2$, an optical fiber coupler $OC_1$, a fiber polarization-independent isolator $ISO_1$ and a saturable absorber or an artificial saturable absorber in sequential connection, and the second ring cavity includes therein a fiber wavelength division multiplexer $WDM_1$, a pumping coupling device, a rare earth ions co-doped fiber, a fiber wavelength division multiplexer $WDM_2$, an optical fiber coupler $OC_2$, a fiber polarization-independent isolator $ISO_2$ and an optical delay line $DL_1$ in sequential connection, the continuous light LD pumping source is connected with the ring cavity via the pumping coupling device;

the first ring cavity constitutes a guiding resonant cavity for laser radiated by sensitizing ions, the second ring cavity constitutes a guided resonant cavity for laser radiated by sensitized ions; and the first ring cavity and the second ring cavity are connected via the fiber wavelength division multiplexer $WDM_1$ and the fiber wavelength division multiplexer $WDM_2$.

Further, the artificial saturable absorber is a nonlinear polarization rotation structure constituted by a fiber polarization controller $PC_1$, a fiber polarizer and a fiber polarization controller $PC_2$ in sequential connection.

Further, when the rare earth ions co-doped fiber has a single cladding, the pumping coupling device is a tri-wavelength fiber wavelength division multiplexer with a signal fiber capable of transmitting both lasers radiated by sensitizing ions and sensitized ions, and the continuous light LD pumping source has a single mode pigtail output;

when the rare earth ions co-doped fiber has double claddings, the pumping coupling device is a fiber beam combiner, and the continuous light LD pumping source has a multi-mode pigtail output.

Further, the dual-wavelength synchronous pulsed fiber laser further comprises, following the resonant cavity, an optical delay line $DL_2$, a fiber wavelength division multiplexer WDM and an output terminal in sequential connection.

Further, the rare earth ions co-doped fiber is a single cladding Erbium-Ytterbium co-doped optical fiber or a dual-cladding Erbium-Ytterbium co-doped optical fiber.

As compared to prior art, some beneficial effects lie as follows. With the dual-wavelength synchronous pulsed fiber laser based on rare earth ions co-doped fiber provided in the present application, on the one hand, dual-wavelength synchronous pulse output with laser separation is realized with a rare earth ions co-doped fiber as gain fiber, which simplifies the structure of dual-wavelength synchronous pulsed fiber laser and avoids the shortcoming of narrow operating bandwidth with traditional saturable absorber; and on the other hand, the device has a high integration level, may be implemented with totally fibers and is in favor of practical applications; and on yet another aspect, it may output dual-wavelength synchronous pulse laser with shorter output pulse width, higher peak power and better pulse overlap, which realizing much higher application efficiency.

DETAILED DESCRIPTION

In order to make the object, technical solution and advantages of the present application clearer, the present application will be further described in detail below with reference to accompanying drawings and embodiments. It should be understood that specific embodiments described herein serve only to explain the present application rather than limiting the present application.

The primary idea to achieve the present application is as follows. After sensitizing ions in the rare earth ions co-doped fiber absorb pumping light and transit from ground state to excited state, some excited state sensitizing ions interact with sensitized ions such that sensitized ions are pumped from ground state to excited state by energy transfer, and excited sensitized ions return to ground state through energy level transition and emit laser of one wavelength; meanwhile, some other excited state sensitizing ions return to ground state through energy level transition and emit laser of another wavelength. Based on the above-described principle, two resonant cavities are constructed in which one is used to transmit laser emitted by sensitizing ions and the other is used to transmit laser emitted by sensitized ions. Each of the cavities may be linear cavity or ring cavity (both of them are linear cavities or ring cavities in embodiments of the present application). These two resonant cavities have approximately equal lengths. Cavity lengths of the two cavities may be made strictly equal through precise adjustment by inserting an optical delay line $DL_1$ in the laser can cavity in which sensitized ions (or sensitizing ions) radiate (in embodiments of the present application, optical delay lines $DL_1$ are all inserted in the laser cavity in which sensitized ions radiate). Laser radiated by sensitizing ions are Q-switched or mode locked to generate pulsed laser by inserting a saturable absorber or an artificial saturable absorber with proper parameters in the laser cavity in which sensitizing ions radiate. This process modulates the gain of laser radiated by sensitized ions periodically and generates synchronous pulse laser, thereby implementing a dual-wavelength synchronous pulsed fiber laser. Regardless of synchronous Q-switched gain switched pulses or synchronous mode locked pulses output from the two resonant cavities, due to different reasons such as energy transfer and different life times of energy levels for two lasers, there is a certain delay in time between two synchronous pulse sequences. Optical path difference between these two beams of laser is precisely controlled by an optical delay line $DL_2$ such that the two synchronous pulses are better overlapped and output together from the output terminal through a WDM.

This kind of dual-wavelength synchronous pulsed fiber laser will be described as below in some specific embodiments.

Figure 1:
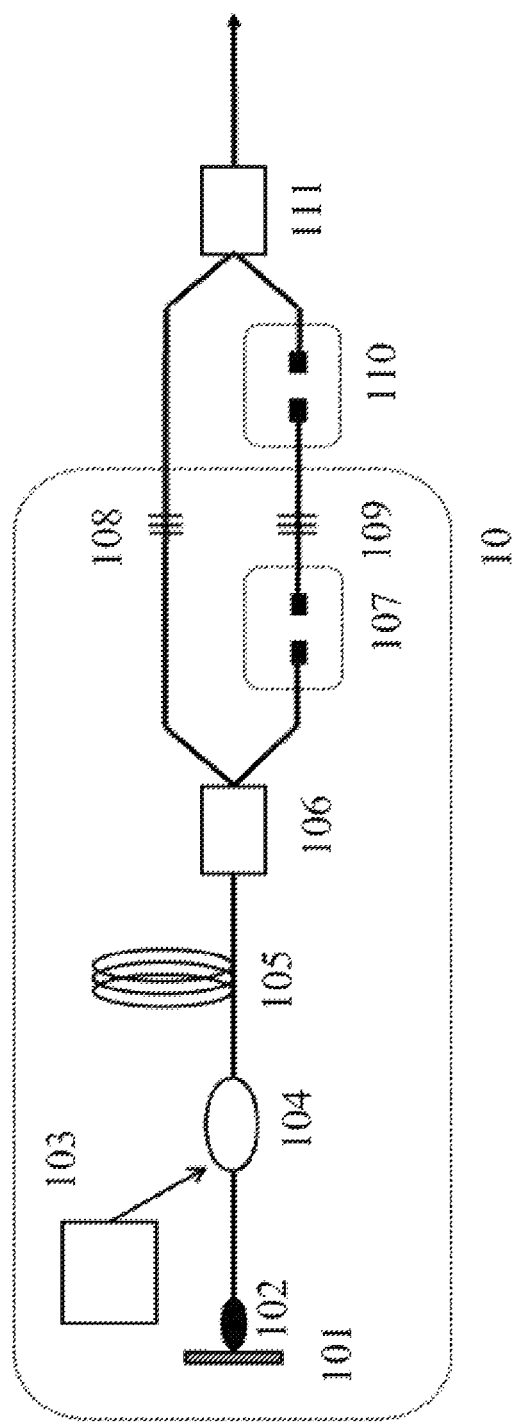
FIG. 1 is a structural schematic view of a linear cavity dual-wavelength synchronous pulsed fiber laser based on rare earth ions co-doped fiber according to a first embodiment of the present application.

In embodiment I, a linear cavity dual-wavelength synchronous pulsed fiber laser based on rare earth ions co-doped fiber is described as shown in FIG. 1.

The linear cavity dual-wavelength synchronous pulsed fiber laser includes a broadband mirror 101, a saturable absorber 102, a continuous light LD pumping source 103 with pigtail output, a pumping coupling device 104, a rare earth ions co-doped fiber 105, a fiber wavelength division multiplexer $WDM_1$ 106, an optical delay line $DL_1$ 107, a fiber Bragg grating $FBG_1$ 108, a fiber Bragg grating $FBG_2$ 109, and further includes an optical delay line $DL_2$ 110, a fiber wavelength division multiplexer $WDM_2$ 111 and an output terminal.

Among them, devices 101-109 constitute a linear cavity dual-wavelength synchronous pulsed fiber laser 10 and devices 110-111 are configured to better overlap these two synchronous pulses and output them together at the same time.

Specifically, the broadband mirror 101, the fiber Bragg grating $FBG_1$ 108 and devices between them constitute a guiding resonant cavity for sensitizing-ion-radiated laser. The broadband mirror 101, the fiber Bragg grating $FBG_2$ 109 and devices between them constitute a guiding resonant cavity for sensitized-ion-radiated laser. The guiding resonant cavity for sensitizing-ion-radiated laser and the guiding resonant cavity for sensitized-ion-radiated laser are connected with each other by the fiber wavelength division multiplexer $WDM_1$ 106.

Specifically, the rare earth ions co-doped fiber 105 is a single cladding Erbium-Ytterbium co-doped fiber wherein the sensitizing ions are Ytterbium ions radiating 1 μm laser and the sensitized ions are Erbium ions radiating 1.5 μm laser. Continuous light LD pumping source 103 is a 975 nm LD with a single pigtail output and the pumping coupling device 104 is a tri-wavelength wavelength division multiplexer of 975/1064&1550 nm of which the signal fiber can transmit lasers of 1064 nm and 1550 nm simultaneously and couple the pumping light into the Erbium-Ytterbium co-doped fiber. The broadband mirror 101 is a broadband reflective gold film highly reflecting lasers of 1 μm and 1.5 μm bands, the saturable absorber 102 is a carbon nanotube thin film which only applies Q-switching or mode locking to 1 μm laser. The carbon nanotube thin film and the broadband reflective gold film are plated on end surfaces of the signal fiber of the 975/1064&1550 nm wavelength division multiplexer in turn. The fiber wavelength division multiplexer $WDM_1$ 106 and the fiber wavelength division multiplexer $WDM_2$ 111 are WDMs of 1064/1550 nm; the optical delay line $DL_1$ 107 and the optical delay line $DL_2$ 110 operate at the 1.5 μm band, the fiber Bragg grating $FBG_1$ 108 and the fiber Bragg grating $FBG_2$ 109 have central wavelengths of Bragg reflections respectively corresponding to 1 μm and 1.5 μm and partially transmit lasers of 1 μm and 1.5 μm respectively (with a transmissivity ranging from 5% to 80%, and may be 10%). The broadband reflective gold film, the fiber Bragg grating $FBG_1$ 108 and devices there between form a guiding resonant cavity for 1 μm laser and the generated 1 μm pulsed laser is output via the fiber Bragg grating $FBG_1$ 108. The broadband reflective gold film, the fiber Bragg grating $FBG_2$ 109 and devices there between form a guiding resonant cavity for 1.5 μm laser and the generated 1.5 μm pulsed laser is output via the fiber Bragg grating $FBG_2$ 109.

Q-Switching of 1 μm Laser:

The saturable absorber 102 functions only to laser radiated by sensitizing ions. The saturable absorber 102 applies Q-switching to laser as radiated by sensitizing ions and applies gain modulation to laser radiated by sensitized ions, thereby generating 1 μm Q-switched pulsed laser of sensitizing ions and outputting it from the fiber Bragg grating $FBG_1$ 108, generating 1.5 μm synchronous gain switched pulsed laser of sensitized ions and outputting it from the fiber Bragg grating $FBG_2$ 109. There is a certain delay in time between two synchronous pulse lasers radiated by sensitizing ions and sensitized ions. Optical path difference between these two beams of laser is precisely controlled by an optical delay line $DL_2$ 110 such that the two synchronous pulses are better overlapped and output at the same time from the output terminal.

Mode Locking of 1 μm Laser:

The saturable absorber 102 applies mode locking to laser as radiated by sensitizing ions and applies gain modulation to laser radiated by sensitized ions, thereby generating 1 μm mode locked pulsed laser of sensitizing ions and outputting it from the fiber Bragg grating $FBG_1$ 108. The cavity lengths of the two 1 μm and 1.5 μm laser resonant cavities are made equal through precise adjustment by the optical delay line $DL_1$ 107. Now 1.5 μm synchronously pumped mode locked pulsed laser of sensitized ions is generated and output from the fiber Bragg grating $FBG_2$ 109. There is a certain delay in time between two synchronous pulse lasers radiated by sensitizing ions and sensitized ions. Optical path difference between these two beams of laser is precisely controlled by an optical delay line $DL_2$ 110 such that the two synchronous pulses are better overlapped and output at the same time from the output terminal.

Figure 2:
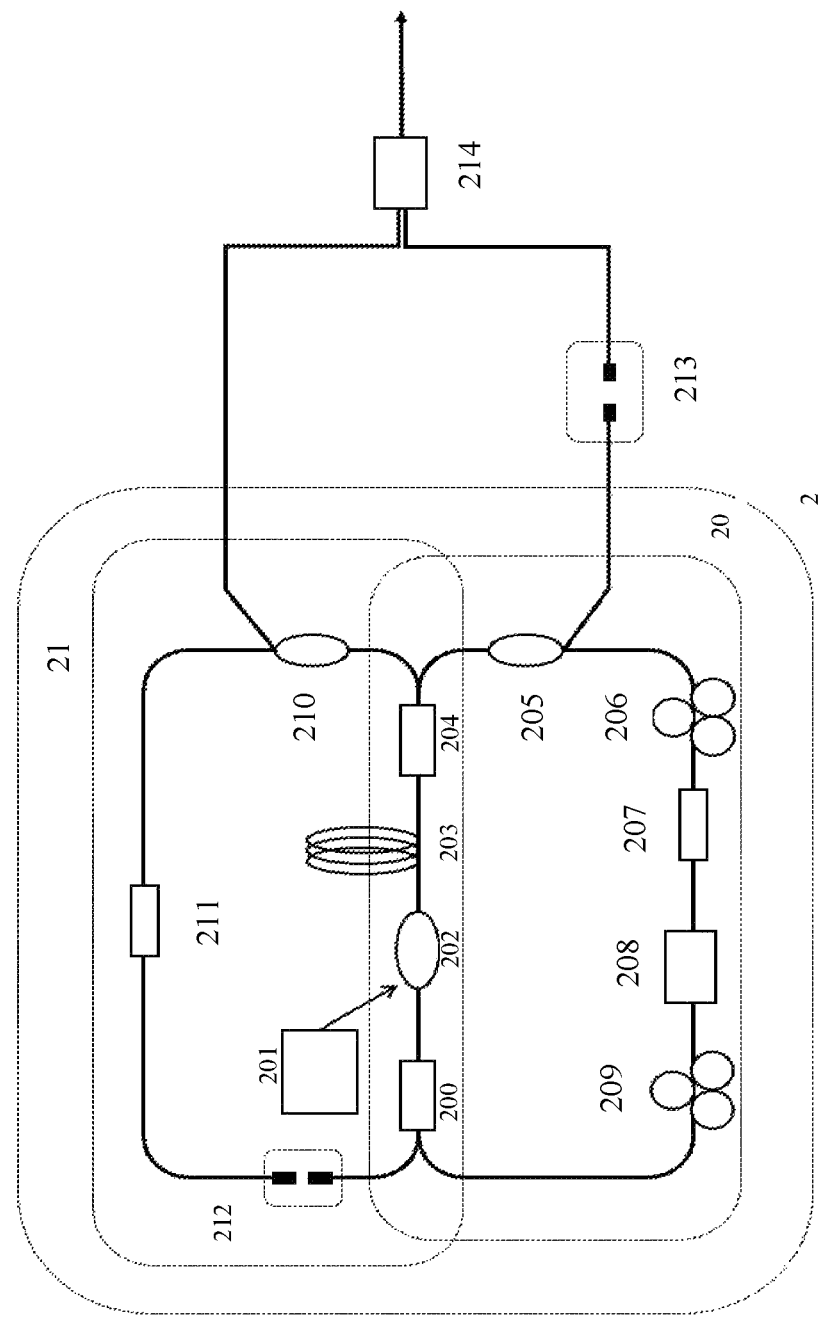
FIG. 2 is a structural schematic view of a ring cavity dual-wavelength synchronous pulsed fiber laser based on rare earth ions co-doped fiber according to a second embodiment of the present application.

In embodiment II, a ring cavity dual-wavelength synchronous pulsed fiber laser based on rare earth ions co-doped fiber is described as shown in FIG. 2.

The ring cavity dual-wavelength synchronous pulsed fiber laser includes a fiber wavelength division multiplexer $WDM_1$ 200, a continuous light LD pumping source 201 with pigtail output, a pumping coupling device 202, a rare earth ions co-doped fiber 203, a fiber wavelength division multiplexer $WDM_2$ 204, an optical fiber coupler $OC_1$ 205, a fiber polarization controller $PC_1$ 206, a fiber polarization-independent isolator $ISO_1$ 207, a fiber polarizer 208, a fiber polarization controller $PC_2$ 209, an optical fiber coupler $OC_2$ 210, a fiber polarization-independent isolator $ISO_2$ 211, an optical delay line $DL_1$ 212, and further includes an optical delay line $DL_2$ 213, a fiber wavelength division multiplexer $WDM_3$ 214 and an output terminal.

Among them, devices 200-209 constitute a guiding resonant cavity 20 for laser radiated by sensitizing ions, devices 200-204, 210-212 constitute a guiding resonant cavity 21 for laser radiated by sensitized ions; the two ring cavities are connected by the fiber wavelength division multiplexer $WDM_1$ 200 and the fiber wavelength division multiplexer $WDM_2$ 204 and constitute a ring cavity dual-wavelength synchronous pulsed fiber laser 2; and devices 213-214 are configured to better overlap these two synchronous pulses and output them at the same time.

Specifically, the rare earth ions co-doped fiber 203 is a dual-cladding Erbium-Ytterbium co-doped fiber wherein the sensitizing ions are Ytterbium ions radiating 1 μm laser and the sensitized ions are Erbium ions radiating 1.5 μm laser. The continuous light LD pumping source 201 is a 975 nm LD with a multi-mode pigtail output and the pumping coupling device 202 is a (2+1)×1 fiber beam combiner and couples the pumping light into the Erbium-Ytterbium co-doped fiber. The fiber wavelength division multiplexer $WDM_1$ 200 and the fiber wavelength division multiplexer $WDM_2$ 204 are 1064/1550 nm WDMs and connect the two ring cavities. The optical fiber coupler $OC_1$ 205 and the optical fiber coupler $OC_2$ 210 operate at 1 μm and 1.5 μm bands respectively and output 1 μm and 1.5 μm band lasers respectively. The fiber polarization-independent isolator $ISO_1$ 207 and the fiber polarization-independent isolator $ISO_2$ 211 operate at 1 μm and 1.5 μm bands respectively such that the ring cavities in which they are located respectively are unidirectionally turned on, thereby effectively avoiding space hole burning. The device 208 is a 1 μm band fiber polarizer and constitutes a NPR (Nonlinear polarization rotation) structure (namely an artificial saturable absorber) with the fiber polarization controller $PC_1$ 206 and the fiber polarization controller $PC_2$ 209 for Q-switching or mode locking of 1 μm laser. The optical delay line $DL_1$ 212 and the optical delay line $DL_2$ 213 operate at 1.5 μm band. The 1 μm pulsed laser generated by the 1 μm laser guiding resonant cavity constituted by devices 200-209 is output by the optical fiber coupler $OC_1$ 205, and the 1.5 μm pulsed laser generated by the 1.5 μm laser guiding resonant cavity constituted by devices 200-204, 210-212 is output by the optical fiber coupler $OC_2$ 210.

Q-Switching of 1 μm Laser:

NPR applies Q-switching to the laser as radiated by sensitizing ions and applies gain modulation to laser radiated by sensitized ions, which generates 1 μm Q-switched pulsed laser of sensitizing ions and outputs the laser from the optical fiber coupler $OC_1$ 205, and generates 1.5 μm synchronous gain switched pulsed laser of the sensitized ions and outputs the laser from the optical fiber coupler $OC_2$ 210. There is a certain delay in time between two synchronous pulse lasers radiated by sensitizing ions and sensitized ions. Optical path difference between these two beams of laser is precisely controlled by an optical delay line $DL_2$ 213 such that the two synchronous pulses are better overlapped and output at the same time from the output terminal.

Mode Locking of 1 μm Laser:

NPR applies mode locking to laser radiated by sensitizing ions and applies gain modulation to laser radiated by sensitized ions, thereby generating 1 μm mode locked pulsed laser of sensitizing ions and outputting it from the optical fiber coupler $OC_1$. The cavity lengths of the two 1 μm and 1.5 μm laser resonant cavities are made equal by precisely adjusting the optical delay line $DL_1$ 212. Now synchronous 1.5 μm pumped mode locked pulsed laser of sensitized ions is generated and output from the optical fiber coupler $OC_2$ 210. There is a certain delay in time between two synchronous pulse lasers radiated by sensitizing ions and sensitized ions. Optical path difference between these two beams of laser is precisely controlled by an optical delay line $DL_2$ 213 such that the two synchronous pulses are better overlapped and output at the same time from the output terminal.

In embodiments of the present application, the device 208 is a fiber polarizer that may form a nonlinear polarization rotation (NPR) structure with the two fiber polarization controllers $PC_1$, $PC_2$. In fact, the device 208 may also be a saturable absorber. Regardless of saturable absorber or fiber polarizer that may form nonlinear polarization rotation (NPR) structure with the two fiber polarization controllers $PC_1$, $PC_2$, and they are all active to the laser radiated by sensitizing ions.

Figure 3:
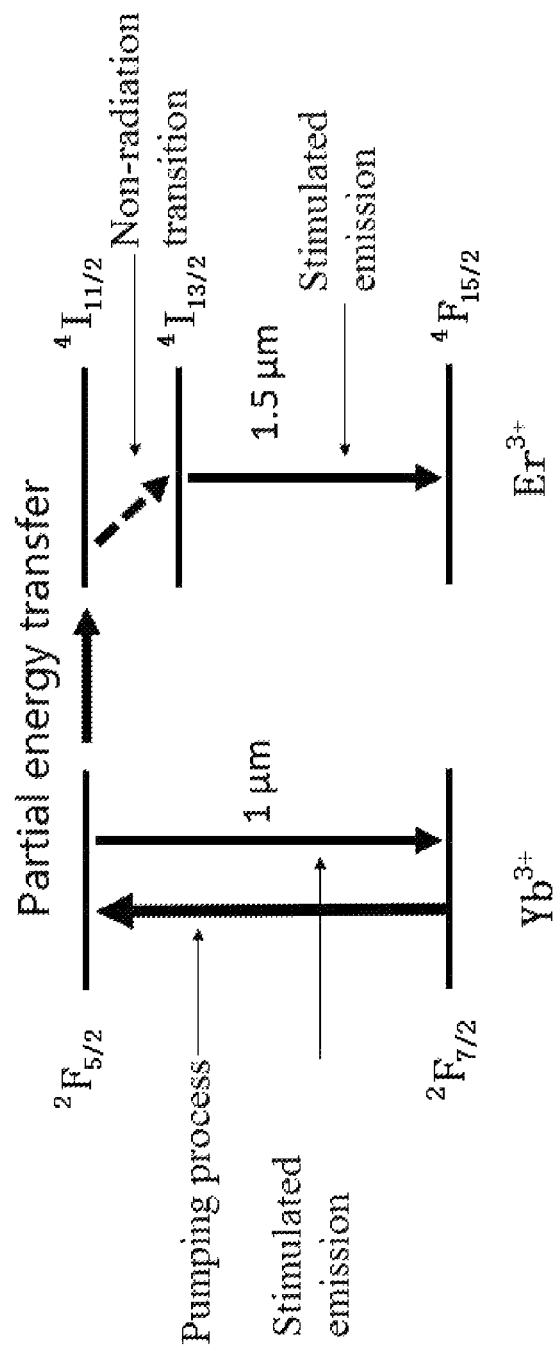
FIG. 3 is a schematic view showing process of generating laser in the Erbium-Ytterbium co-doped fibers in the first and second embodiments of the present application.

Herein below, the operation principles of embodiment I and embodiment II will be described further with reference to FIG. 3.

Having coupling the 975 nm continuous pumping light into the Erbium-Ytterbium co-doped fiber, after the $Yb^{3+}$ ions as sensitizer absorb pumping light transit from ground state $^2F_{7/2}$ level to $^2F_{5/2}$ level, partial excited state $Yb^{3+}$ ions interact with $Er^{3+}$ ions, and pump $Er^{3+}$ ions from ground state $^4F_{15/2}$ level to the $^4I_{11/2}$ level by energy transfer. Further, there is also partial excited state $Yb^{3+}$ ions form population inversion distribution between levels $^2F_{5/2} \rightarrow {}^2F_{7/2}$, which transit back to the ground state $^2F_{7/2}$ level through $^2F_{5/2} \rightarrow {}^2F_{7/2}$ level transition, thereby radiating 1 μm continuous laser in the 1 μm laser guiding resonant cavity. Meanwhile, $Er^{3+}$ ions that have been pumped to the $^4I_{11/2}$ level get relaxed by transiting to the $^4I_{13/2}$ level through non-radiation transition process and form a population inversion distribution between $^4I_{13/2} \rightarrow {}^4F_{15/2}$ levels. Then these excited state $Er^{3+}$ ions return to the ground state $^4F_{15/2}$ level through $^4I_{13/2} \rightarrow {}^4F_{15/2}$ level transition and radiate 1.5 μm continuous laser in the 1.5 μm laser guiding resonant cavity.

Q-Switching of 1 μm Laser:

The 1 μm continuous laser is subjected to passive modulation with the saturable absorption effect of NPR or carbon nanotube thin film to generate 1 μm Q-switched pulsed laser in the guiding resonant cavity. Due to the energy transfer and non-radiation transition, the process of generating 1 μm Q-switched pulsed laser modulates the population inversion of $^4I_{13/2} \rightarrow {}^4F_{15/2}$ periodically, that is, the 1.5 μm laser corresponding to the $^4I_{13/2} \rightarrow {}^4F_{15/2}$ level transition is gain modulated periodically. Since this process takes long time, the population inversion accumulated on level $^4I_{13/2}$ is enough (enough gain) to generate 1.5 μm gain switched pulsed laser. Since the inversion population in the two processes $^2F_{5/2} \rightarrow {}^2F_{7/2}$ and $^4I_{13/2} \rightarrow {}^4F_{15/2}$ are accumulated synchronously, the generated 1 μm Q-switched pulses and 1.5 μm gain switched pulses are synchronous, which is independent on whether the 1.5 μm laser guiding resonant cavity has equal cavity length as the 1 μm laser guiding resonant cavity. However, due to reasons such as different $^2F_{5/2}$ level life and $^4I_{13/2}$ level life, different inversion population of $^2F_{5/2} \rightarrow {}^2F_{7/2}$ and $^4I_{13/2} \rightarrow {}^4F_{15/2}$, and a certain time required for energy transfer and non-radiation transition, there is a certain delay between the 1 μm and 1.5 μm synchronous Q-switched and gain switched pulses.

Mode Locking of 1 μm Laser:

Similarly, the 1 μm continuous laser is subjected to passive modulation with the saturable absorption effect of NPR or carbon nanotube thin film to generate 1 μm mode locked pulsed laser in the guiding resonant cavity. Part of 1 μm mode locked pulsed laser is reabsorbed by $Yb^{3+}$ and then transferred to $Er^{3+}$, and this process applies periodic gain modulation to the 1.5 μm laser corresponding to the $^4I_{13/2} \rightarrow {}^4F_{15/2}$ level transition. However, since the mode-locked pulses have a period much smaller than that of the Q-switched pulses, the period of this gain modulation is significantly shortened. In case insufficient inversion population is accumulated on the $^4I_{13/2}$ level, it is not enough to generate 1.5 μm gain switched pulsed laser. However, if now control is done to make the 1.5 μm laser guided resonant cavity and the 1 μm laser guiding resonant cavity to have equal cavity lengths such that the period of gain modulation equals the 1.5 μm photons round trip time in the guided resonant cavity, the initial pulse in the guided resonant cavity can only be amplified if $Er^{3+}$ ions are pumped by excited state $Yb^{3+}$ ions (by energy transfer) to a population inversion state exactly when the initial pulse reaches the gain medium. Cycling in that manner, stable 1.5 μm synchronously pumped mode-locked pulses are finally obtained. Similarly, due to reasons such as different $^2F_{5/2}$ level life and $^4I_{13/2}$ level life, different inversion population of $^2F_{5/2} \rightarrow {}^2F_{7/2}$ and $^4I_{13/2} \rightarrow {}^4F_{15/2}$, and a certain time required for energy transfer and non-radiation transition, there is a certain delay between the 1 μm and 1.5 μm synchronous mode-locked pulses. This synchronous mode locked pulse has a shorter pulse width and a higher peak power as compared to the aforementioned synchronous Q-witched gain switched pulse.

Further, the rare earth ions co-doped fibers in both embodiments of the present application are Erbium-Ytterbium co-doped fibers. In fact, the present application is also applicable to other rare earth ions co-doped fibers such as Thulium-Ytterbium co-doped fibers. Furthermore, if a polarization maintaining rare earth ions co-doped fiber and a polarization maintaining device are used, the system may realize linearly polarized dual-wavelength synchronous laser pulse output.

The present application implements a dual-wavelength synchronous pulsed fiber laser of total fibers with a rare earth ions co-doped fiber having energy transfer between ions, which has a high integration level, can implement structures totally with fiber and is in favor of practical applications.

What have been described above are merely preferred embodiments of the present invention rather than limiting the invention. Any modifications, equivalent substitutions and improvements made in the spirit and principle of the present invention should be encompassed in the scope of the present invention.

What is claimed is:

1. A dual-wavelength synchronous pulsed fiber laser based on rare earth ions co-doped fiber, wherein said dual-wavelength synchronous pulsed fiber laser comprises a continuous light LD pumping source, a rare earth ions co-doped fiber and two resonant cavities, said continuous light LD pumping source is connected with common part of said two resonant cavities, said rare earth ions co-doped fiber is common gain medium of said two resonant cavities for absorbing pumping light emitted from said continuous light LD pumping source and radiating lasers, and said two resonant cavities are two linear cavities or two ring cavities; a first one of said two resonant cavities constitutes a guiding resonant cavity for laser radiated by sensitizing ions, and a second one of said two resonant cavities constitutes a guided resonant cavity for laser radiated by sensitized ions, and a saturable absorber which functions only to laser radiated by sensitizing ions is inserted in a first one of said resonant cavities, wherein said linear cavities contain therein a broadband mirror, the saturable absorber, a pumping coupling device, a rare earth ions co-doped fiber, a fiber wavelength division multiplexer $WDM_1$, an optical delay line $DL_1$, a fiber Bragg grating $FBG_1$ and a fiber Bragg grating $FBG_2$;

said linear cavities comprise a first linear cavity and a second linear cavity, wherein said first linear cavity contains therein the broadband mirror, the saturable absorber, the pumping coupling device, the rare earth ions co-doped fiber, the fiber wavelength division multiplexer $WDM_1$ and the fiber Bragg grating $FBG_1$ in sequential connection, said second linear cavity contains therein the broadband mirror, the saturable absorber, the pumping coupling device, the rare earth ions co-doped fiber, the fiber wavelength division multiplexer $WDM_1$, the optical delay line $DL_1$ and the fiber Bragg grating $FBG_2$ in sequential connection; and said continuous light LD pumping source is connected with said linear cavity via said pumping coupling device;

said first linear cavity and said second linear cavity are connected via said fiber wavelength division multiplexer $WDM_1$, when said rare earth ions co-doped fiber has a single cladding, said pumping coupling device is a tri-wavelength fiber wavelength division multiplexer with a signal fiber capable of transmitting both lasers radiated by sensitizing ions and sensitized ions, and said continuous light LD pumping source acts as a single mode pigtail output;

when said rare earth ions co-doped fiber has double claddings, said pumping coupling device is a fiber beam combiner, and said continuous light LD pumping source acts as a multi-mode pigtail output, wherein said dual-wavelength synchronous pulsed fiber laser further comprises, following said resonant cavity, an optical delay line $DL_2$, a fiber wavelength division multiplexer WDM and an output terminal in sequential connection.

2. The dual-wavelength synchronous pulsed fiber laser of claim 1, wherein said broadband mirror is one of a dielectric mirror, a metal mirror and a fiber mirror.

3. The dual-wavelength synchronous pulsed fiber laser of claim 1, wherein said fiber Bragg grating $FBG_1$ has a central wavelength of Bragg reflection corresponding to a wavelength of laser as radiated by sensitizing ions and a transmissivity of 5% to 80% for said wavelength; said fiber Bragg grating $FBG_2$ has a central wavelength of Bragg reflection corresponding to a wavelength of laser radiated by sensitized ions and a transmissivity of 5% to 80% for said wavelength.

4. The dual-wavelength synchronous pulsed fiber laser of claim 1, wherein said ring cavity contains therein the fiber wavelength division multiplexer $WDM_1$, the pumping coupling device, the rare earth ions co-doped fiber, the fiber wavelength division multiplexer $WDM_2$, an optical fiber coupler $OC_1$, a fiber polarization-independent isolator $ISO_1$ and the saturable absorber, an optical fiber coupler $OC_2$, a fiber polarization-independent isolator $ISO_2$ and the optical delay line $DL_1$;

said ring cavity comprises a first ring cavity and a second ring cavity, wherein said first ring cavity contains therein the fiber wavelength division multiplexer $WDM_1$, the pumping coupling device, the rare earth ions co-doped fiber, the fiber wavelength division multiplexer $WDM_2$, the optical fiber coupler $OC_1$, the fiber polarization-independent isolator $ISO_1$ and the saturable absorber in sequential connection, and said second ring cavity contains therein the fiber wavelength division multiplexer $WDM_1$, the pumping coupling device, the rare earth ions co-doped fiber, the fiber wavelength division multiplexer $WDM_2$, the optical fiber coupler $OC_2$, the fiber polarization-independent isolator $ISO_2$ and the optical delay line $DL_1$ in sequential connection, wherein said continuous light LD pumping source is connected with said ring cavity via said pumping coupling device;

and said first ring cavity and said second ring cavity are connected each other via said fiber wavelength division multiplexer $WDM_1$ and said fiber wavelength division multiplexer $WDM_2$.

5. The dual-wavelength synchronous pulsed fiber laser of claim 4, wherein said artificial saturable absorber is a nonlinear polarization rotation structure constituted by a fiber polarization controller $PC_1$, a fiber polarizer and a fiber polarization controller $PC_2$ in sequential connection.

6. The dual-wavelength synchronous pulsed fiber laser of claim 1, wherein said rare earth ions co-doped fiber is a single cladding Erbium-Ytterbium co-doped optical fiber or a dual-cladding Erbium-Ytterbium co-doped optical fiber.

* * * * *